US009639679B2

(12) United States Patent
Nada et al.

(10) Patent No.: US 9,639,679 B2
(45) Date of Patent: May 2, 2017

(54) BIOMETRIC AUTHENTICATION SYSTEM, BIOMETRIC AUTHENTICATION METHOD, AND RECORDING MEDIUM

(71) Applicant: FUJITSU LIMITED, Kawasaki-shi, Kanagawa (JP)

(72) Inventors: Hajime Nada, Kawasaki (JP); Yukihiro Abiko, Kawasaki (JP); Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 14/030,191

(22) Filed: Sep. 18, 2013

(65) Prior Publication Data

US 2014/0020090 A1 Jan. 16, 2014

Related U.S. Application Data

(63) Continuation of application No. PCT/JP2011/056848, filed on Mar. 22, 2011.

(51) Int. Cl.
G06F 21/00 (2013.01)
G06F 21/32 (2013.01)
(Continued)

(52) U.S. Cl.
CPC ............ G06F 21/32 (2013.01); G06K 9/036 (2013.01); G06K 9/6807 (2013.01); G06K 9/00114 (2013.01); G06K 9/3233 (2013.01)

(58) Field of Classification Search
CPC ..... G06F 21/31; G06F 21/32; G06K 9/00114; G06K 9/036; G06K 9/3233; G06K 9/6807
See application file for complete search history.

(56) References Cited

U.S. PATENT DOCUMENTS

2004/0013287 A1 1/2004 Takeuchi et al.
2009/0316963 A1 12/2009 Boshira
(Continued)

FOREIGN PATENT DOCUMENTS

EP 2 192 548 A1 6/2010
JP 2002-197460 7/2002
(Continued)

OTHER PUBLICATIONS

International Search Report mailed Apr. 19, 2011 in corresponding International Application No. PCT/JP2011/056848.

Primary Examiner — Brandon Hoffman
Assistant Examiner — Thong Truong
(74) Attorney, Agent, or Firm — Staas & Halsey LLP

(57) ABSTRACT

A biometric authentication system (1) records, in a storage unit in an associating manner, position information of a feature area on an image of biometric information whose biometric authentication is successful and reference biometric information referred to in the successful biometric authentication, the feature area being specific to a living-body, and detects a feature area that is specific to a living-body from an image of biometric information of an input object to be authenticated, and narrows down the reference biometric information stored in the storage unit to reference biometric information to be compared with the biometric information of the object to be authenticated, based on the degree of similarity between each position information, and authenticates the biometric information of the object to be authenticated by comparing the reference biometric information obtained as a narrowing-down result and the biometric information of the object to be authenticated.

5 Claims, 13 Drawing Sheets

(51) Int. Cl.
    *G06K 9/68*     (2006.01)
    *G06K 9/03*     (2006.01)
    *G06K 9/00*     (2006.01)
    *G06K 9/32*     (2006.01)

(56) References Cited

U.S. PATENT DOCUMENTS

2010/0045787 A1     2/2010   Uno
2010/0202665 A1*   8/2010   Mohammad et al. ........ 382/115

FOREIGN PATENT DOCUMENTS

JP     2004-145447     5/2004
JP     2009-86951     4/2009

* cited by examiner

BIOMETRIC AUTHENTICATION SYSTEM, BIOMETRIC AUTHENTICATION METHOD, AND RECORDING MEDIUM

CROSS-REFERENCE TO RELATED APPLICATION

This application is a continuation application of International Application PCT/JP2011/056848 filed on Mar. 22, 2011 and designating the U.S., the entire contents of which are incorporated herein by reference.

FIELD

The present invention relates to a biometric authentication system, a biometric authentication method, and a biometric authentication program.

BACKGROUND

Examples of a biometric authentication technique include "1:1 authentication" and "1:N authentication." The 1:1 authentication refers to a method that performs authentication by comparing biometric information input by a user and biometric information registered in advance in association with the identification information of the user. The 1:N authentication refers to a method that performs authentication by comparing biometric information input by a user and the biometric information of N people registered in advance. When the 1:N authentication is employed, because the biometric data input by the user is compared with the biometric data of N people registered in advance, a lager registration number N of biometric data requires more time to output an authentication result.

Examples of a technique that reduces authentication time in the 1:N authentication include a fingerprint comparison apparatus that compares selection parameters representing feature quantities of fingerprints between an input fingerprint and registered fingerprints, thereby narrowing down the registered fingerprints to be compared with the input fingerprint. In this fingerprint comparison apparatus, the selection parameters are compared before comparison, which include the ratio of a ridge area with respect to the entire fingerprint area, the space between a ridge and a valley, and the number of endpoints and bifurcations that a ridge or valley of a fingerprint has.

Patent Literature 1: Japanese Patent Application Laid-open No. 2004-145447

However, the above-mentioned prior art is problematic in that the accuracy of narrowing down is not stable as will be described below.

Specifically, the above-mentioned fingerprint comparison apparatus performs narrowing down on the precondition that the fingerprint does not change for the same user between the time when the fingerprint was registered and the time when the fingerprint is used for authentication. It is difficult for the above-mentioned fingerprint comparison apparatus to cope with narrowing down when a temporary change occurs in a living body due to a scratch, chapping, or the like, because when the temporary change occurs in a fingerprint due to a scratch, chapping, or the like, a difference in a selection parameter to be compared between an input fingerprint and registered fingerprints increases even if the fingerprint is of the same user. In the above-mentioned fingerprint comparison apparatus, therefore, even when the registered fingerprints are narrowed down by comparing the selection parameters between the input fingerprint and the registered fingerprints, the registered fingerprint of the user is not always included in the registered fingerprints that are obtained as a narrowing-down result, and are compared with the input fingerprint.

SUMMARY

According to an aspect of the embodiment of the invention, a biometric authentication system includes a registering unit that records, in a storage unit in an associating manner, position information of a feature area on an image of biometric information whose biometric authentication is successful and reference biometric information referred to in the successful biometric authentication, the feature area being specific to a living-body. The biometric authentication system includes a detecting unit that detects a feature area that is specific to a living-body from an image of biometric information of an input object to be authenticated. The biometric authentication system includes a narrowing-down unit that narrows down the reference biometric information stored in the storage unit to reference biometric information to be compared with the biometric information of the object to be authenticated, based on position information of the feature area detected by the detecting unit and the position information of the feature area stored in the storage unit. The biometric authentication system includes an authenticating unit that authenticates the biometric information of the object to be authenticated by comparing the reference biometric information obtained as a narrowing-down result by the narrowing-down unit and the biometric information of the object to be authenticated.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The following describes embodiments of a biometric authentication system, a biometric authentication method, and a biometric authentication program disclosed by the present invention in detail with reference to the drawings. The embodiments do not limit the disclosed technique. The embodiments may be appropriately combined to the extent that the processing details do not contradict each other.

First Embodiment

System Configuration

Figure 1:
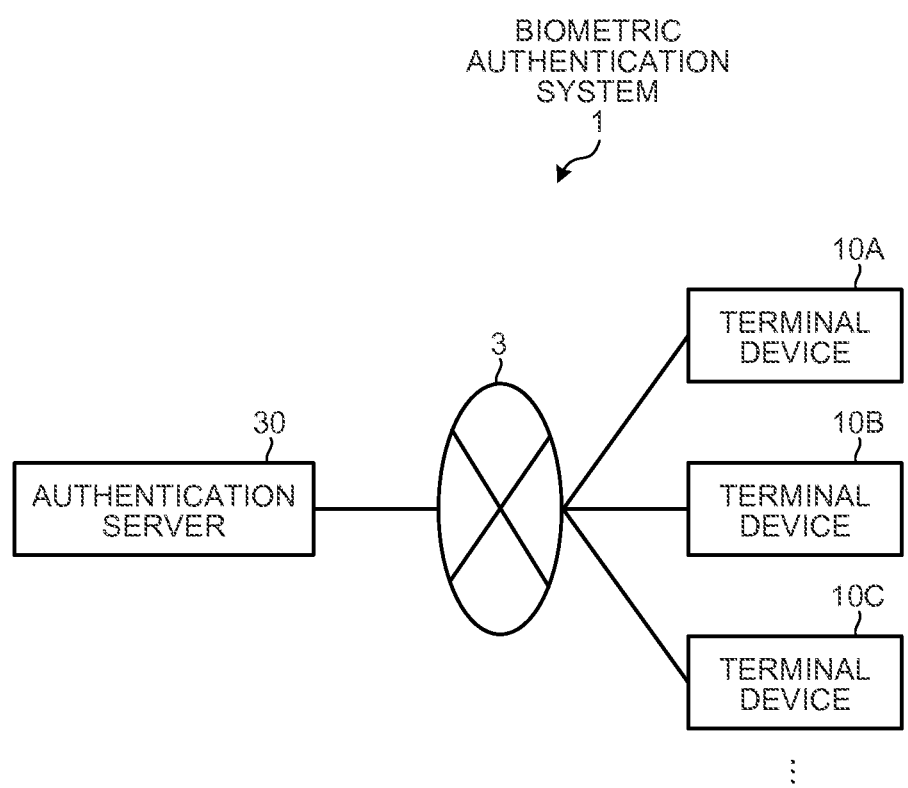
FIG. 1 is a diagram illustrating the configuration of a biometric authentication system according to a first embodiment.

Described first is a configuration of a biometric authentication system according to the present embodiment. FIG. 1 is a diagram illustrating the configuration of a biometric authentication system according to the first embodiment. The biometric authentication system 1 illustrated in FIG. 1 houses terminal devices 10A to 10C and an authentication server 30. The example of FIG. 1 assumes a case in which 1:N fingerprint authentication is performed between fingerprint data of a user input from either one of the terminal devices 10A to 10C and a plurality pieces of fingerprint data registered in advance.

The terminal devices 10A to 10C and the authentication server 30 are connected by a network 3 in a communicable manner. As an embodiment of the network 3, communication networks such as the Internet, a local area network (LAN), and a virtual private network (VPN) may be employed.

Although the example of FIG. 1 illustrates three terminal devices and one authentication server, the disclosed system is not limited to the illustrated configuration. Specifically, the biometric authentication system 1 only needs to house at least one each of the terminal device and the authentication server, and any number of terminal devices and authentication servers may be housed. When the terminal devices 10A to 10C are described below without being discriminated from each other, they may be represented as the terminal device 10.

The terminal device 10 is an information processing unit that is used by a user. As an embodiment of the terminal device 10, mobile terminals such as a cellular phone, a personal handyphone system (PHS), a personal digital assistant (PDA), and a smartphone may be employed as well as a stationary terminal such as a personal computer (PC). The following description will be made with an assumption that the user logs in to a PC.

To log in to the terminal device 10, the terminal device 10 receives the inputting of a fingerprint image of a user in place of an account and a password and permits or prohibits a log-in by the user to the terminal device 10 in accordance with the result of fingerprint authentication performed by the authentication server 30 described below.

Specifically, the terminal device 10 generates fingerprint data to be used when fingerprint authentication is performed by the authentication server 30 described below, from an image obtained by reading a fingerprint by a fingerprint sensor (not illustrated). The image obtained by reading a fingerprint by the fingerprint sensor of the terminal device 10 may be referred to as the fingerprint image below. The fingerprint data generated from the fingerprint image may be referred to as the input fingerprint data, and the fingerprint data registered in advance in the authentication server 30 described below may be referred to as the registered fingerprint data below.

Furthermore, the terminal device 10 generates, from the fingerprint image read by the fingerprint sensor, narrowing-down data to be used to perform narrowing down to the registered fingerprint data to be compared with the input fingerprint data by the authentication server 30 described below. The narrowing-down data generated from the fingerprint image may be referred to as the input narrowing-down data, and the narrowing-down data registered in advance in the authentication server 30 described below may be referred to as the registered narrowing-down data below.

After that, the terminal device 10 transmits the fingerprint data and the narrowing-down data generated from the fingerprint image to the authentication server 30 described below. The terminal device 10 thus transmits the fingerprint data and the narrowing-down data generated from the fingerprint image instead of the fingerprint data itself to the network 3, thereby preventing the fingerprint, which is a piece of personal information of the user, from leaking to the outside. Although a case is exemplified in which the terminal device 10 generates the fingerprint data and the narrowing-down data from the fingerprint image, a configuration may be employed in which the terminal device 10 transmits the fingerprint image to the authentication server 30 as it is and the authentication server 30 generates the fingerprint data and the narrowing-down data.

When an authentication result by the authentication server 30 described below is a success, the terminal device 10 permits a log-in by the user to the terminal device 10. In other words, the terminal device 10 allows the user to log in thereto by automatically inputting an account name and a password. The security of identification of the user is thereby improved over password authentication, and risks that a password is forgotten or leaked are reduced.

In contrast, when the authentication result by the authentication server 30 described below is a failure, the terminal device 10 prohibits a log-in by the user to the terminal device 10. In this case, the terminal device 10 may output a notification that prompts the user to input the finger image again, may give a warning of unsuccessful authorization to use the terminal device 10, or may lock the operation of the terminal device 10.

The authentication server 30 is a server device that provides a fingerprint authentication service. The authentication server 30, upon reception of the input fingerprint data and the input narrowing-down data from the terminal device 10, performs narrowing down to the registered fingerprint data to be compared with the input fingerprint data prior to fingerprint authentication, using the input narrowing-down data and the registered narrowing-down data. As an example, the authentication server 30 performs narrowing down to registered fingerprint data corresponding to registered narrowing-down data whose degree of narrowing-down similarity calculated from the input narrowing-down data and the registered narrowing-down data is within a predetermined ratio with respect to the total number N of pieces of the registered fingerprint data, for example, within the top one-tenth (=N/10). As another example, the authentication server 30 performs narrowing down to registered fingerprint data corresponding to registered narrowing-down data whose degree of narrowing-down similarity calculated from the input narrowing-down data and the registered narrowing-down data is not less than a predetermined threshold.

After that, the authentication server 30 compares the input fingerprint data and the registered fingerprint data obtained as a narrowing-down result, thereby performing authentication. As an example, the authentication server 30 repeats processing that determines whether the degree of comparison similarity calculated from the input fingerprint data and the registered fingerprint data is not less than a predetermined threshold until the input fingerprint data is compared with all pieces of registered fingerprint data obtained earlier as a narrowing-down result. When the degree of comparison similarity is not less than the threshold with respect to at least one piece of registered fingerprint data, the authentication server 30 replies to the terminal device 10 that the authentication of the input fingerprint data is successful. In contrast, when the degree of comparison similarity is less than the threshold with respect to all pieces of registered fingerprint data, the authentication server 30 replies to the terminal device 10 that the authentication of the input fingerprint data is unsuccessful.

The biometric authentication system 1 according to the present embodiment registers, in a storage unit in an associating manner, position information of an area in which a fingerprint-specific feature is unclear on a fingerprint image corresponding to the input fingerprint data whose fingerprint authentication is successful and the registered fingerprint data referred to in the successful fingerprint authentication. The biometric authentication system 1 according to the present embodiment then detects an area in which a fingerprint-specific feature is unclear from a fingerprint image corresponding to input fingerprint data that has been newly input. Furthermore, based on the degree of similarity between the position information of the area obtained as a detection result and the position information of the area stored in the storage unit, the biometric authentication system 1 according to the present embodiment narrows down the registered fingerprint data stored in the storage unit to registered fingerprint data to be compared with the input fingerprint data. Furthermore, the biometric authentication system 1 according to the present embodiment compares the registered fingerprint data obtained as a narrowing-down result with the input fingerprint data, thereby performing authentication.

Thus, even when the fingerprint of the user changes due to a scratch or chapping, the biometric authentication system 1 according to the present embodiment adds the position information of the area whose fingerprint-specific feature is unclear on the fingerprint image due to the scratch or chapping, to the registered fingerprint data as narrowing-down data once authentication is successful. As a result, when fingerprint data having a scratch or chapping is input in later authentication, the biometric authentication system 1 according to the present embodiment performs narrowing down to registered fingerprint data having position information similar to the position information of that area. The biometric authentication system 1 according to the present embodiment therefore has an increased probability that the registered fingerprint data of the user who inputs the fingerprint is included in the narrowing-down result.

The biometric authentication system 1 according to the present embodiment can therefore stabilize the accuracy of narrowing down. Furthermore, because the biometric authentication system 1 according to the present embodiment has an increased probability that the registered fingerprint data of the user who inputs the fingerprint is included in the narrowing-down result, it can prevent a failure in authentication following a failure in narrowing down and reduce an authentication time from the inputting of a fingerprint to the outputting of an authentication result.

Configuration of Terminal Device 10

Figure 2:
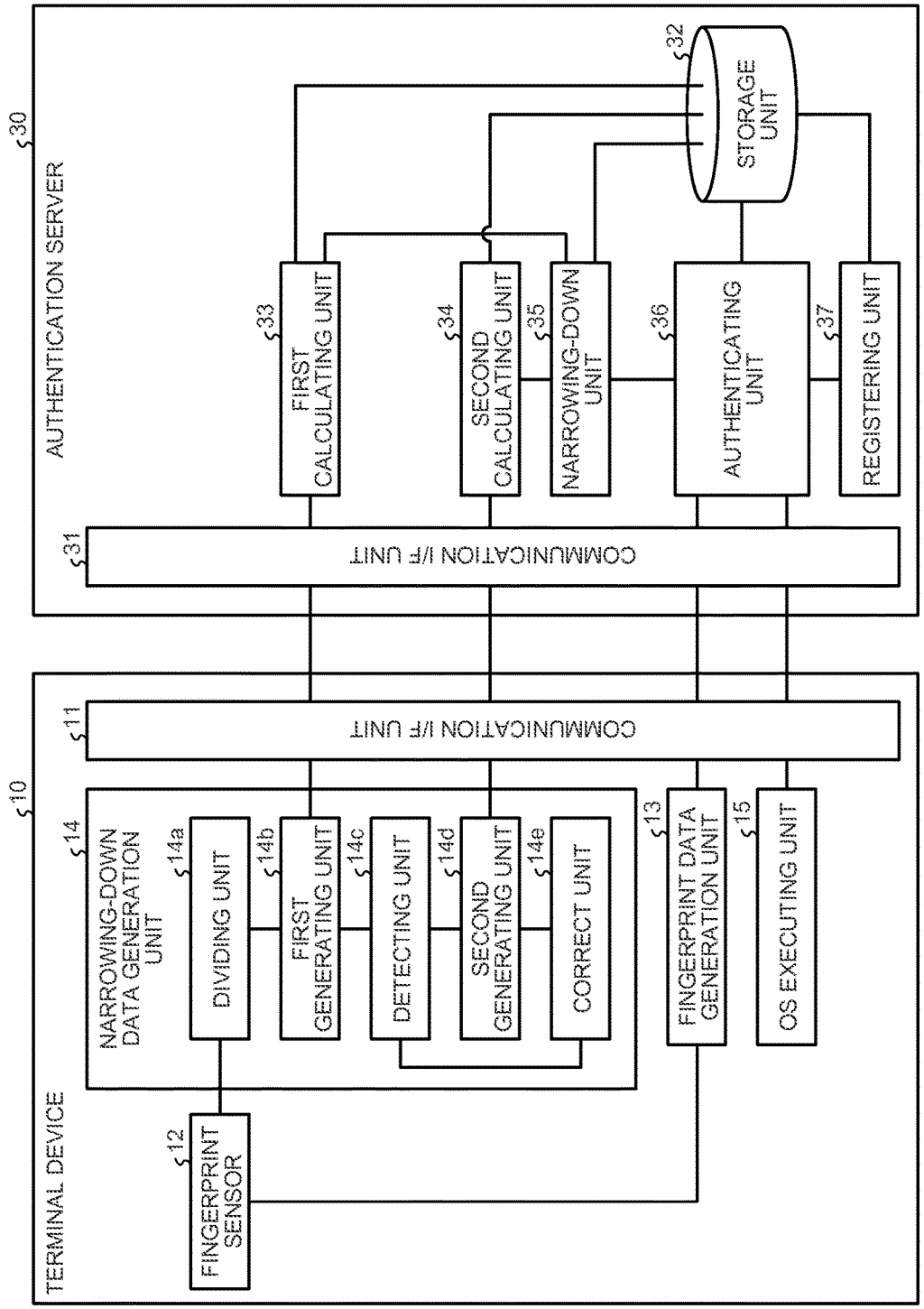
FIG. 2 is a block diagram illustrating the configuration of devices included in the biometric authentication system according to the first embodiment.

Described next is a configuration of a terminal device according to the present embodiment. FIG. 2 is a block diagram illustrating the configuration of the devices included in the biometric authentication system according to the first embodiment. As illustrated in FIG. 2, this terminal device 10 includes a communication interface (I/F) unit 11, a fingerprint sensor 12, a fingerprint data generating unit 13, a narrowing-down data generating unit 14, and an operating system (OS) executing unit 15. The terminal device 10 may have, in addition to the functional units illustrated in FIG. 2, various functional units such as various input devices and voice output devices included in a conventional PC.

The communication I/F unit 11 is an interface that controls communications with other devices such as the authentication server 30. For example, the communication I/F unit 11 transmits fingerprint data generated by the fingerprint data generating unit 13 described below and narrowing-down data generated by the narrowing-down data generating unit 14 described below to the authentication server 30 and receives an authentication result from the authentication server 30. As an embodiment of the communication I/F unit 11, a network interface card (NIC) such as a LAN card or a modem may be employed.

The fingerprint sensor 12 is a sensor that reads a fingerprint. As an installation example of the fingerprint sensor 12, an embodiment in which the fingerprint sensor 12 is incorporated into the terminal device 10 may be employed, or an embodiment in which it is connected to the terminal device 10 through a universal serial bus (USB) or the like may be employed. As an example of the detection method of the fingerprint sensor 12, any detection method may be employed including a capacitance type, an electric-field detection type, an optical type, a thermosensitive type, and a pressure-sensitive type. An example of the reading method of the fingerprint sensor 12 may be of a slide type in which a finger pad, that is, the central part of a fingertip is slid or may be a stamp type in which a finger pad is placed.

The fingerprint data generating unit 13 is a processing unit that generates fingerprint data for use in fingerprint authentication from a fingerprint image. As an example, the fingerprint data generating unit 13 generates fingerprint data from a fingerprint image read by the fingerprint sensor 12 in accordance with any authentication method such as the minutiae method, the pattern matching method, and the frequency analysis method employed by an authenticating unit 36 of the authentication server 30 described below.

For example, when the minutiae method is employed by the authenticating unit 36 described below, the fingerprint data generating unit 13 generates the direction and position relation of feature points, such as endpoints and bifurcations of ridges, included in a pattern of the fingerprint image and the correlation between the feature points as fingerprint data. When the pattern matching method is employed by the authenticating unit 36 described below, the fingerprint data generating unit 13 generates an image in which the fingerprint image is binarized or thinned as fingerprint data. When the frequency analysis method is employed by the authenticating unit 36 described below, the fingerprint data generating unit 13 generates a waveform spectral series when a cross-section obtained by slicing a pattern of the fingerprint image is regarded as a waveform, as fingerprint data.

The narrowing-down data generating unit 14 is a processing unit that generates narrowing data for use in the narrowing down of the registered fingerprint data, from the fingerprint image. The narrowing-down data generating unit 14 includes, as illustrated in FIG. 2, a dividing unit 14a, a first generating unit 14b, a detecting unit 14c, a second generating unit 14d, and a correcting unit 14e.

The dividing unit 14a is a processing unit that divides the fingerprint image into blocks with a certain size. As an example, the dividing unit 14a searches the fingerprint image read by the fingerprint sensor 12, thereby detecting a reference point of the fingerprint, for example, a fingerprint center that is the center of a pattern (a whorl) forming the fingerprint. Based on the fingerprint center detected in the searching of the fingerprint image, the dividing unit 14a cuts an area targeted for later processing such as generation of narrowing-down data, out of the fingerprint image and divides the image of the area into blocks.

Figure 3:
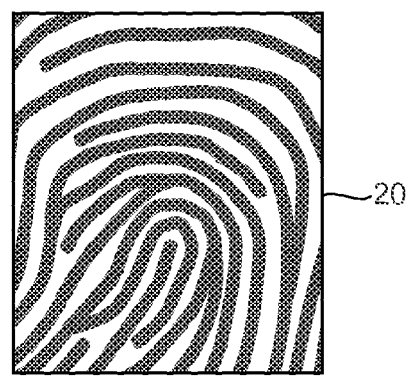
FIG. 3 is a diagram for describing how a fingerprint image is cut out.
Figure 3:
Figure 3:
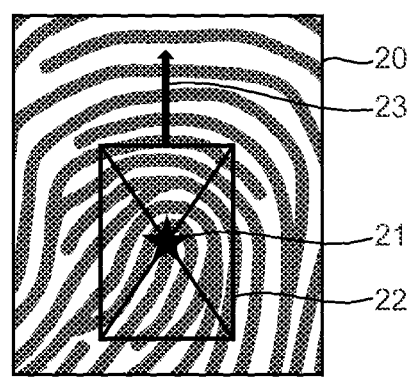
Figure 3:
Figure 3:
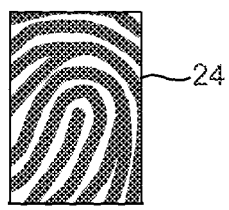

Described now is the cutting out of the fingerprint image. FIG. 3 is a diagram for describing how a fingerprint image is cut out. As illustrated in FIG. 3, the dividing unit 14a searches a fingerprint image 20 read by the fingerprint sensor 12. Through the searching, the dividing unit 14a detects a fingerprint center 21 that is the center of a pattern forming the fingerprint, from the fingerprint image 20. The dividing unit 14a then sets a cut-out area 22 of the fingerprint image 20 with the fingerprint center 21 in the fingerprint image 20 as the center or the gravity center. The dividing unit 14a sets a rectangle with a longitudinal direction 23 being the vertical direction with respect to the wrinkle of the first joint of the finger, that is, the fingertip direction as the cut-out area 22. The dividing unit 14a sets the size of the cut-out area 22 to be such a size that the area can be divided into a certain number of blocks. The dividing unit 14a then cuts the cut-out area 22 out of the fingerprint image 20, thereby extracting a cut-out fingerprint image 24.

The dividing unit 14a performs the cutting out of the fingerprint image 20 in accordance with reference information transmitted from the first generating unit 14b described below and the second generating unit 14d described below, for example, the type of a singular point as the reference point of the fingerprint or the size of the cut-out area 22. It may be defined in advance in the dividing unit 14a that the cutting out is performed by the same cutting-out method used when generating first narrowing-down data and second narrowing-down data registered in a storage unit 32 of the authentication server 30.

After thus performing the cutting out of the fingerprint image, the dividing unit 14a divides the fingerprint image into blocks with the number of pixels corresponding to a value that is about a few times, for example, double the representative size of the space between adjacent ridges in a finger of an adult as the size of a side of the blocks, so that the blocks each include part of a plurality of ridges. For example, when the representative value of the space between ridges in a finger of an adult is about 0.2 mm, the dividing unit 14a divides the fingerprint image into blocks with the number of pixels corresponding to about 0.4 mm as the size of a side of the block. The dividing unit 14a outputs the fingerprint image divided into blocks to the first generating unit 14b described below and the detecting unit 14c described below.

The size of one side of the block above may be changed arbitrarily by a system administrator. As an example, when the generation of users is limited to a specific generation like in a school, the dividing unit 14a may automatically set the number of pixels that constitute blocks based on the representative value of the space between ridges in a finger of the specific generation.

The first generating unit 14b is a processing unit that generates the first narrowing-down data related to fingerprint-specific features using the fingerprint image divided into blocks by the dividing unit 14a. The following description will be made with an assumption that the first generating unit 14b generates narrowing-down data related to minutiae as the first narrowing-down data. As an example, the first generating unit 14b calculates, for each block of the fingerprint image, the widths of ridges detected within the block, the spaces between ridges detected within the block, the number of minutiae detected within the block, or the like. The widths of ridges, the space between ridges, and the number of minutiae thus calculated are transmitted as the first narrowing-down data to the authentication server 30. The first narrowing-down data generated by the first generating unit 14b may be referred to as the first input narrowing-down data, and the first narrowing-down data registered in the authentication server 30 may be referred to as the first registered narrowing-down data below.

The detecting unit 14c is a processing unit that detects an area in which a fingerprint-specific feature is unclear from the fingerprint image divided into blocks by the dividing unit 14a. The area in which a fingerprint-specific feature is unclear on the fingerprint image, that is, an area of lower quality for performing narrowing down than an area in which a fingerprint-specific feature is clear may be referred to as a low-quality area below.

Figure 4A:
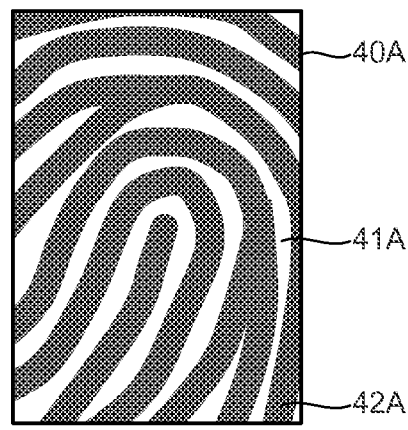
FIG. 4A is a diagram for describing a classification of a low-quality area.
Figure 4B:
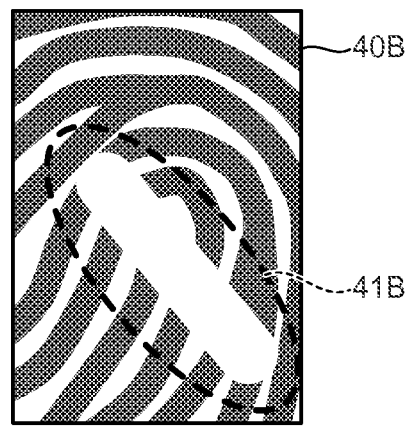
FIG. 4B is a diagram for describing a classification of a low-quality area.
Figure 4C:
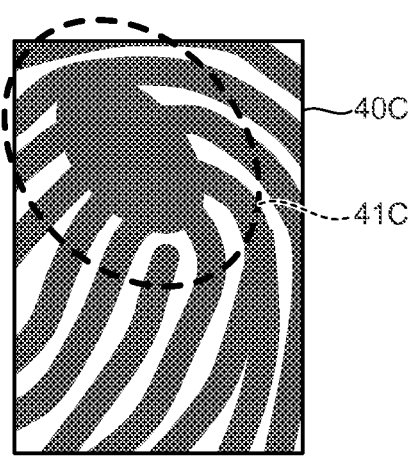
FIG. 4C is a diagram for describing a classification of a low-quality area.
Figure 4D:
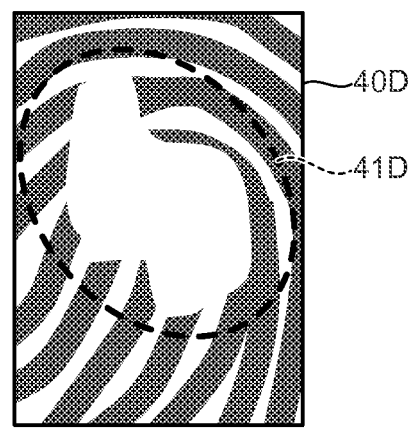
FIG. 4D is a diagram for describing a classification of a low-quality area.

The detecting unit 14c detects the low-quality area on the fingerprint image by occurrence factor. Factors of the occurrence of the above-mentioned low-quality area are classified into scratch, crack, adhesion of a water droplet, chapping, and the like. The water droplet includes perspiration. The chapping includes peeling of skin, callous, and wear. FIG. 4A to FIG. 4D are diagrams for describing each classification of the low-quality area. The reference numeral 40A illustrated in FIG. 4A is given to a fingerprint image with no low-quality area. The reference numeral 40B illustrated in FIG. 4B is given to a fingerprint image in which a scratch is imaged. The reference numeral 40C illustrated in FIG. 4C is given to a fingerprint image in which a water droplet is imaged. The reference numeral 40D illustrated in FIG. 4D is given to a fingerprint image in which chapping is imaged. It is assumed that in the examples of FIG. 4A to FIG. 4D the fingerprints imaged in the fingerprint images 40A to 40D are the fingerprints of the same user.

As illustrated in FIG. 4A, because in the fingerprint image 40A there is no low-quality area on the image, a valley 41A appears whiter than a ridge 42A, the ridge 42A appears blacker than the valley 41A, and the valley 41A, the ridge 42A, and the boundary therebetween appear clear. When the first narrowing-down data is generated from the fingerprint image 40A, narrowing-down data with higher quality can be obtained than in a case in which the first narrowing-down data is generated from a fingerprint image having a low-quality area like the fingerprint images 40B to 40D illustrated in FIG. 4B to FIG. 4D.

As illustrated in FIG. 4B to FIG. 4D, a scratch 41B, a water droplet 41C, and chapping 41D, which are factors that make a fingerprint-specific feature unclear, are present in the fingerprint images 40B to 40D, respectively. In the case of the fingerprint image 40B in which the scratch 41B is imaged, as illustrated in FIG. 4B, because a ridge that was present before the formation of the scratch is damaged and its projection is smaller after the damage of the ridge than before, the pixel value of the damaged part is higher than that of the ridge. In the case of the fingerprint image 40C in which the water droplet 41C is imaged, as illustrated in FIG. 4C, because the valley is filled with the water droplet 41C, the pixel value of the valley is lower than before the valley was filled with the water droplet 41C. In the case of the fingerprint image 40D in which the chapping 41D is imaged, as illustrated in FIG. 4D, because the ridge that was present before the occurrence of the chapping 41D is damaged and its projection is smaller than before the damage of the ridge, the pixel value of the damaged part is higher than that of the ridge. Given these situations, owing to the scratch 41B, the water droplet 41C, and the chapping 41D, it is difficult to accurately calculate the widths of ridges, the spaces between ridges, and how minutiae are formed using the first generating unit 14b. When the first narrowing-down data is generated from the fingerprint image 40B, the fingerprint image 40C, and the fingerprint image 40D, therefore, only narrowing-down data that provides higher frequency of a failure in the narrowing down to the person who inputs the fingerprint is obtained as compared to a case in which the first narrowing-down data is generated from the fingerprint image 40A illustrated in FIG. 4A.

As an embodiment, the detecting unit 14c may employ the following technique as a technique that extracts a scratch and crack on a fingerprint image. Examples of the technique include "Marcelo de Almeida Oliveira, Neucimar Jeronimo Leite: 'Reconnection of Fingerprint Ridges Based on Morphological Operators and Multiscale Directional Information', SIBGRAPI'04, 122-129, 2004." The detecting unit 14c detects a block overlapping an area in which a scratch or crack extracted from a fingerprint image in accordance with the above-mentioned technique is present as a low-quality area with a classification of "scratch (crack)."

Figures 5, 6:
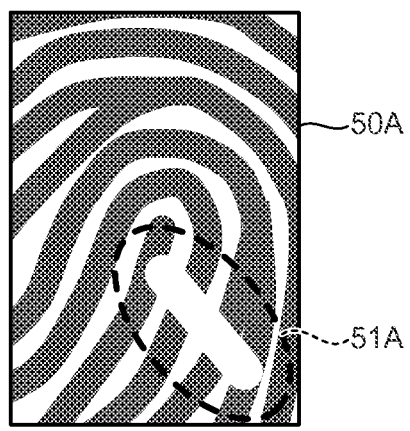
FIG. 5 is a diagram illustrating an example of a fingerprint image.
FIG. 6 is a diagram illustrating identification numbers of blocks.
Figure 7:
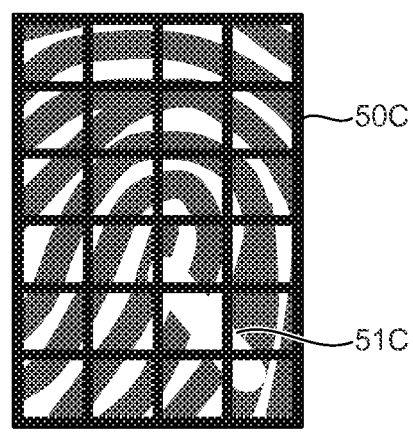
FIG. 7 is a diagram illustrating the fingerprint image divided into blocks.
Figure 8:
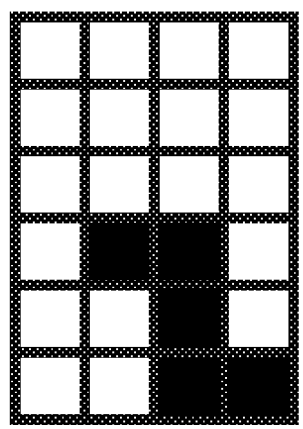
FIG. 8 is a diagram illustrating a detection result of a low-quality area.

Using FIG. 5 to FIG. 8, the following describes a method for detecting a low-quality area. FIG. 5 is a diagram illustrating an example of a fingerprint image. FIG. 6 is a diagram illustrating the identification numbers of blocks. FIG. 7 is a diagram illustrating the fingerprint image divided into blocks. FIG. 8 is a diagram illustrating a detection result of a low-quality area. The figures within the blocks illustrated in FIG. 6 each indicate the identification number of a block. The black-filled part within the blocks illustrated in FIG. 8 indicates the low-quality area.

As illustrated in FIG. 5, a fingerprint image 50A in which a scratch 51A is imaged is divided into 24 (=6 vertical by 4 horizontal) blocks with the identification numbers 1 to 24 by the dividing unit 14a. When the fingerprint image 50A is thus divided, as illustrated in FIG. 7, a fingerprint image 50C divided into blocks with the identification numbers 1 to 24 is obtained. The detecting unit 14c, using the above-mentioned technique, extracts a scratch 51C from the fingerprint image 50C and detects a block overlapping the area at which the scratch 51C is present as a low-quality area. In this case, as illustrated in FIG. 8, because the area of the scratch 51C overlaps the blocks with the identification numbers 14, 15, 19, 23, and 24, they are detected as a low-quality area with a classification of "scratch (crack)" by the detecting unit 14c.

As another embodiment, the detecting unit 14c calculates the degree of unclearness of each block from a fingerprint image using a statistical method or a frequency analysis method. Examples of the statistical method include a method that smoothes a local ridge direction and calculates a difference in the smoothed ridge direction as the degree of unclearness. Examples of the frequency analysis method include a method that, using the fast Fourier transform (FFT), converts a fingerprint image from the spatial domain into the frequency domain and calculates the value of the maximum power spectrum or the kurtosis of the energy distribution of each frequency component as the degree of unclearness. The degree of unclearness thus calculated is an indicator such that a higher degree indicates a higher possibility that the continuity of a pattern of a ridge or a valley is locally broken.

The detecting unit 14c then performs threshold determination on an average pixel value obtained by averaging the pixel values within any block whose degree of unclearness is not less than a predetermined value out of the blocks whose degrees of unclearness have been calculated from the fingerprint image, thereby detecting a low-quality area with a classification of "water droplet" or a classification of "chapping." The reason why the block whose degree of unclearness is not less than a predetermined value is thus targeted for the detection of a low-quality area is because in an area with a high possibility that the continuity of a pattern of a ridge or a valley is locally broken, the possibility of the adhesion of water droplet or the occurrence of chapping is also high.

For example, the detecting unit 14c determines whether an average pixel value within a block is not more than a non-valley threshold, thereby detecting a low-quality area with a classification of "water droplet." In other words, as illustrated in FIG. 4C, when the valley is filled with a water droplet, the pixel value of the filled part is lower than that of the original valley. For this reason, when the average pixel value within a block is not more than a threshold that is just enough to estimate not to be a valley, the block can be estimated to be a low-quality area with a classification of "water droplet." The detecting unit 14c thus detects a block whose average pixel value within the block is not more than a non-valley threshold as a low-quality area with a classification of "water droplet."

Conversely, the detecting unit 14c determines whether an average pixel value within a block is not less than a non-ridge threshold, thereby detecting a low-quality area with a classification of "chapping." In other words, as illustrated in FIG. 4D, when the ridge is damaged with "chapping," the pixel value of the damaged part is higher than that of the original ridge, because the projection of the ridge is lower than the original. For this reason, when the average pixel value within a block is not less than a threshold that is just enough to estimate not to be a ridge, the block can be estimated to be a low-quality area with a classification of "chapping." The detecting unit 14c thus detects a block whose average pixel value within the block is not less than a non-ridge threshold as a low-quality area with a classification of "chapping."

The second generating unit 14d is a processing unit that generates the second narrowing-down data related to a low-quality area. The second narrowing-down data generated by the second generating unit 14d may be referred to as the second input narrowing-down data, and the second narrowing-down data registered in the authentication server 30 may be referred to as the second registered narrowing-down data below.

As an example, the second generating unit 14d generates the second narrowing-down data that includes the identification number of a block forming the low-quality area detected by the detecting unit 14c and the reference information used when the fingerprint image is divided into blocks by the dividing unit 14a by the classification of occurrence factor. The second generating unit 14d then transmits the second narrowing-down data generated by the classification of occurrence factor to the authentication server 30. When the low-quality area is corrected by the correcting unit 14e described below, the second narrowing-down data with a classification of "scratch (crack)" out of the second narrowing-down data generated by the classification of occurrence factor is regenerated using the low-quality area after correction.

The reason why the reference information is thus included in the second narrowing-down data is because alignment is performed between a block included in the second input narrowing-down data and a block included in the second registered narrowing-down data. Examples of the reference information include the identification number of a block at which a singular point such as the center of the whorl of a fingerprint or a delta is present. Although a case is exemplified here in which the identification number of the block forming the low-quality area is regarded as the second narrowing-down data, the position information of the low-quality area is not always generated block by block. For example, the second generating unit 14d may use the pixel positions of low-quality areas with a classification of "scratch (crack)," a classification of "water droplet," and a classification of "chapping" on a fingerprint image, as the second narrowing-down data.

The correcting unit 14e is a processing unit that corrects the low-quality area detected by the detecting unit 14c. As an example, described is a case of correcting a low-quality area with a classification of occurrence factors of "scratch (crack)". The scratch or crack on a fingerprint image read by the fingerprint sensor 12 expands and contracts in its size depending on the magnitude of a force with which a user presses a finger pad against the fingerprint sensor 12, that is, the input state of a fingerprint. For this reason, when a force with which the user presses the finger against the fingerprint sensor 12 varies, the force may cause a situation in which the size of a low-quality area varies even for the second input narrowing-down data and the second registered narrowing-down data of the same user.

Specifically, a larger force with which the user presses against the fingerprint sensor 12 more largely deforms ridges, thereby making the widths of valleys smaller. In contrast, a smaller force with which the user presses against the fingerprint sensor 12 less deforms ridges, making the widths of valleys larger. In other words, a smaller width of a valley means a larger force with which the finger is pressed against the fingerprint sensor 12, thereby contracting the scratch or crack as compared to a case in which an appropriate force is applied in the use of the fingerprint sensor 12. A larger width of a valley means a smaller force with which the finger is pressed against the fingerprint sensor 12, thereby expanding the scratch or crack as compared to a case in which an appropriate force is applied in the use of the fingerprint sensor 12.

The correcting unit 14e thus determines whether the distance between ridges detected from a fingerprint image, that is, the width of a valley is within an appropriate range of the width of the valley suggesting an appropriate force applied in the use of the fingerprint sensor 12.

As an example, the correcting unit 14e determines whether the average value of the distance between ridges detected at a plurality of locations on a fingerprint image, that is, the width of valleys $W_{AV}$ is within an appropriate range of the width of the valley, that is, "$L_1 \leq W_{AV} \leq L_2$." When the average value of the width of valley $W_{AV}$ is smaller than the lower limit value $L_1$ of the appropriate range of the width of the valley, for example, 0.1 mm, it can be estimated that the scratch or crack is in a contracted state as compared to a case in which an appropriate force is applied in the use of the fingerprint sensor 12. The lower limit value $L_1$ of the appropriate range may be appropriately set in accordance with the average value of the width of valleys of fingerprints of human beings, and further, which reading method of the slide type or the stamp type is employed by the fingerprint sensor 12, or the like.

When it is determined that the low-quality area with a classification of "scratch (crack)" detected by the detecting unit 14c is in a contracted state, the correcting unit 14e then performs correction to enlarge the low-quality area. As an example, the correcting unit 14e calculates the short axis that is orthogonal to the long axis of the low-quality area with a classification of "scratch (crack)" and enlarges the low-quality area so that the width of the low-quality area in the short axis direction increases a predetermined fold, for example, about twofold. The enlargement rate of the low-quality area may be set to be higher for a larger amount by which the average value of the width of valleys detected from a plurality of locations on the fingerprint image falls short of the lower limit value of the appropriate range of the width of the valley.

Figure 9:
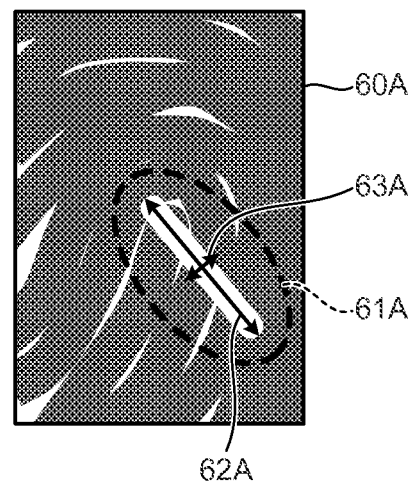
FIG. 9 is a diagram illustrating an example of a fingerprint image.
Figure 10:
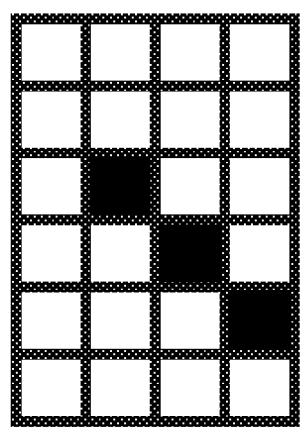
FIG. 10 is a diagram illustrating a detection result of a low-quality area.
Figure 11:
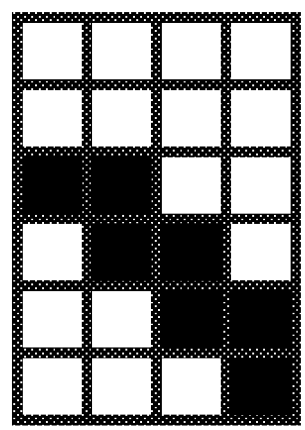
FIG. 11 is a diagram illustrating the low-quality area after correction.

FIG. 9 is a diagram illustrating an example of a fingerprint image. FIG. 10 is diagram illustrating a detection result of a low-quality area. FIG. 11 is a diagram illustrating the low-quality area after correction.

The black-filled part within the blocks illustrated in FIG. 10 and FIG. 11 indicates the low-quality area. In the example of FIG. 9, a case is assumed in which the average value of the width of valleys $W_{AV}$ is smaller than the lower limit value $L_1$ of the appropriate range of the width of the valley.

As illustrated in FIG. 9, a fingerprint image 60A in which a scratch 61A is imaged is divided into 24 (=6 vertical by 4 horizontal) blocks with the identification numbers 1 to 24 by the dividing unit 14a. When the fingerprint image 60A is thus divided, as illustrated in FIG. 10, the blocks with the identification numbers 10, 15, and 20 that are present at positions that overlap the area in which the scratch 61A is present are detected as a low-quality area with a classification of "scratch (crack)." The correcting unit 14e calculates the short axis 63A that is orthogonal to the long axis 62 in the low-quality area with a classification of "scratch (crack)." The correcting unit 14e then, as illustrated in FIG. 11, performs the correction of the low-quality area to add the blocks with the identification numbers 9, 14, 19, and 24 in the same direction as the short axis 63A to the low-quality area formed of the identification numbers 10, 15, and 20. The low-quality area after correction is thereby the identification numbers 9, 10, 14, 15, 19, 20, and 24.

In contrast, when the average value $W_{AV}$ of the width of valleys is larger than the upper limit value $L_2$ of the appropriate range of the width of the valley, for example, 0.3 mm, it can be estimated that the scratch or crack is in an expanded state as compared to a case in which an appropriate force is applied in the use of the fingerprint sensor 12. The upper limit value $L_2$ of the appropriate range may be appropriately set in accordance with the average value of the width of valleys of fingerprints of human beings, and further, which reading method of the slide type or the stamp type is employed by the fingerprint sensor 12, or the like.

The correcting unit 14e then performs correction to reduce the low-quality area with a classification of "scratch (crack)" detected by the detecting unit 14c. As an example, the correcting unit 14e calculates the short axis that is orthogonal to the long axis of the low-quality area with a classification of "scratch (crack)" and reduces the low-quality area so that the width of the low-quality area in the short axis direction increases a predetermined fold, for example, about two-thirds fold. The reduction rate of the low-quality area may be set to be higher for a larger amount by which the average value of the width of valleys detected from a plurality of sites on the fingerprint image exceeds the upper limit value of the appropriate range of the width of the valley.

Figure 12:
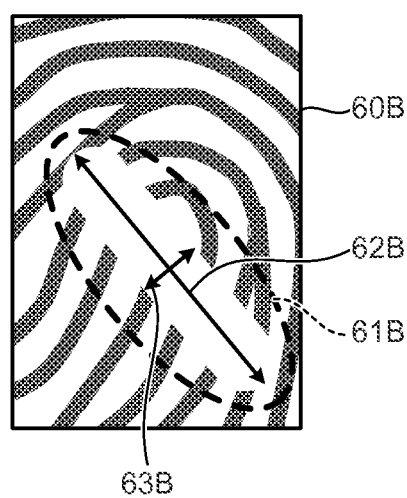
FIG. 12 is a diagram illustrating an example of a fingerprint image.
Figure 13:
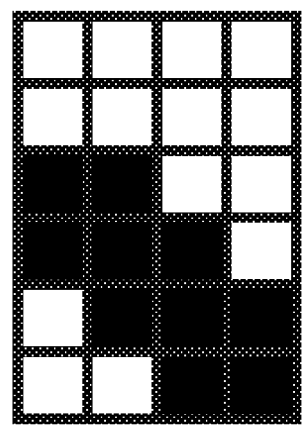
FIG. 13 is a diagram illustrating a detection result of a low-quality area.
Figure 14:
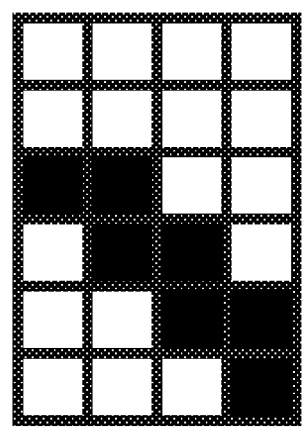
FIG. 14 is a diagram illustrating the low-quality area after correction.

FIG. 12 is a diagram illustrating an example of a fingerprint image. FIG. 13 is a diagram illustrating a detection result of a low-quality area. FIG. 14 is a diagram illustrating the low-quality area after correction. The black-filled part within the blocks illustrated in FIG. 13 and FIG. 14 indicates the low-quality area. In the example of FIG. 12, a case is assumed in which the average value of the width of valleys $W_{AV}$ is larger than the upper limit value $L_2$ of the appropriate range of the width of the valley.

As illustrated in FIG. 12, a fingerprint image 60B in which a scratch 61B is imaged is divided into 24 (=6 vertical by 4 horizontal) blocks with the identification numbers 1 to 24 by the dividing unit 14a. When the fingerprint image 60B is thus divided, as illustrated in FIG. 13, the blocks with the identification numbers 9, 10, 13, 14, 15, 18, 19, 20, 23, and 24 that are present at positions that overlap the area in which the scratch 61B is present are detected as a low-quality area with a classification of "scratch (crack)." The correcting unit 14e calculates the short axis 63B that passes through the center of the long axis 62B of the low-quality area. The correcting unit 14e then, as illustrated in FIG. 14, performs the correction of the low-quality area to remove the blocks with the identification numbers 13, 18, and 23 that are present in the same direction as the short axis 63B from the low-quality area formed of the identification numbers 9, 10, 13, 14, 15, 18, 19, 20, 23, and 24. The low-quality area after correction is thereby the identification numbers 9, 10, 14, 15, 19, 20, and 24.

After the low-quality area is thus corrected, the second generating unit 14d regenerates the second narrowing-down data including the identification numbers of the blocks forming the low-quality area corrected by the correcting unit 14e and the reference information used at the time of division into blocks. When the average value of the width of valleys $W_{AV}$ is within the appropriate range of the width of the valley, that is, "$L_1 \leq W_{AV} \leq L_2$," the correction of the low-quality area by the correcting unit 14e is not performed, and the second narrowing-down data generated by the second generating unit 14d is transmitted to the authentication server 30.

In the present embodiment, although a case is exemplified in which the low-quality area is enlarged or reduced by the size of the block obtained through division by the dividing unit 14a, the processing executed by the correcting unit 14e is not limited thereto. For example, to achieve the enlargement or reduction of the low-quality area by finer unit, the correcting unit 14e may enlarge or reduce the low-quality area divided into smaller blocks than the blocks divided by the dividing unit 14a. As an example, the blocks divided by the dividing unit may be further divided.

The OS executing unit 15 is a processing unit that controls the execution of an OS, which is basic software controlling the entire computer system.

As an example, the OS executing unit 15 performs processing related to a log-on and log-off. For example, when an authentication result received from the authentication server 30 is a success, the OS executing unit 15 permits a log-in by the user to the terminal device 10. In other words, the OS executing unit 15 automatically inputs an account name and a password, thereby allowing the user to log in thereto.

In contrast, when the authentication result received from the authentication server 30 is a failure, the OS executing unit 15 prohibits a log-in by the user to the terminal device 10. In this case, the OS executing unit 15 may output a notification that prompts the user to input the finger image again to a display unit or voice output unit (not illustrated) or may give a warning of unsuccessful authorization to use the terminal device 10 to the display unit or voice output unit (not illustrated). The OS executing unit 15 may also lock the operation of the terminal device 10.

For the fingerprint data generating unit 13, the narrowing-down data generating unit 14, and the OS executing unit 15, various integrated circuits and electronic circuits may be employed. Part of a functional unit included in the narrowing-down data generating unit 14 may be a separate integrated circuit or electronic circuit. Examples of the integrated circuit include an application specific integrated circuit (ASIC). Examples of the electronic circuit include a central processing unit (CPU) and a micro processing unit (MPU).

Configuration of Authentication Server

Described next is the configuration of the authentication server according to the present embodiment. As illustrated in FIG. 2, the authentication server 30 includes a communication I/F unit 31, the storage unit 32, a first calculating unit 33, a second calculating unit 34, a narrowing-down unit 35, the authenticating unit 36, and a registering unit 37. The authentication server 30 may include, in addition to the functional units illustrated in FIG. 2, various functional units that a known server device includes, for example, various input devices and voice output devices.

The communication I/F unit 31 is an interface that controls communications with other devices such as the terminal device 10 and the like. For example, the communication I/F unit 31 receives the input fingerprint data, the first input narrowing-down data, and the second input narrowing-down data from the terminal device 10 and transmits the authentication result of the input fingerprint data to the terminal device 10. As an embodiment of the communication I/F unit 31, network interface cards such as a LAN card and a modem can be employed.

The storage unit 32 is a storage unit that stores therein the input fingerprint data, the first input narrowing-down data, and the second input narrowing-down data in association with each other. As an example, in order to calculate a first degree of narrowing-down similarity between the first input narrowing-down data and the first registered narrowing-down data, the storage unit 32 is referred to by the first calculating unit 33 described below. As another example, in order to calculate a second degree of narrowing-down similarity between the second input narrowing-down data and the second registered narrowing-down data, the storage unit 32 is referred to by the second calculating unit 34 described below. As still another example, in order to perform narrowing down to the registered fingerprint data to be compared with the input fingerprint data, the storage unit 32 is referred to by the narrowing-down unit 35 described below.

As an example, in order to compare the input fingerprint data and the registered fingerprint data, the storage unit 32 is referred to by the authenticating unit 36 described below. As another example, in order to register, in an associating manner, the second narrowing-down data input together with the input fingerprint data whose biometric authentication is successful at the authenticating unit 36 described below and the registered fingerprint data referred to in the successful biometric authentication, the storage unit 32 is referred to by the registering unit 37.

The fingerprint data is the registered fingerprint data registered in advance in the authentication server 30, which is fingerprint data compliant with any authentication method such as the minutiae method, the pattern matching method, and the frequency analysis method employed by the authenticating unit 36 described below. The first narrowing-down data is the first registered narrowing-down data registered in advance in the authentication server 30 and is narrowing-down data that includes the width of a ridge, the space between ridges, the number of minutiae, or the like associated with each other for each block. The second narrowing-down data is the second registered narrowing-down data registered in advance in the authentication server 30 and is narrowing-down data that includes the identification numbers of blocks forming a low-quality area and the reference information of the blocks.

For the storage unit 32, a semiconductor memory element and a storage device can be employed. Examples of the semiconductor memory include a video random access memory (VRAM), a random access memory (RAM), and a flash memory. Examples of the storage device include a hard disk and an optical disk.

The first calculating unit 33 is a processing unit that calculates the first degree of narrowing-down similarity from the first input narrowing-down data and the first registered narrowing-down data. As an example, the first calculating unit 33 calculates the first degree of narrowing-down similarity from the first input narrowing-down data and the first registered narrowing-down data in any block forming an area that is not a low-quality area in both the input fingerprint data and the registered fingerprint data. An area other than the low-quality area, that is, a high-quality area in which a fingerprint-specific feature is clear on a fingerprint image may be denoted as a high-quality area below.

Specifically, the first calculating unit 33 refers to the both reference information of the first input narrowing-down data and the first registered narrowing-down data, thereby performing alignment of the blocks of the two. The first calculating unit 33 then calculates a high-quality area, that is, a set of blocks each having an identification number other than the identification numbers of blocks forming a low-quality area in the input fingerprint data. The first calculating unit 33 then calculated a high-quality area in the registered fingerprint data. The first calculating unit 33 then calculates an area in which the high-quality areas of the input fingerprint data and the registered fingerprint data are present in common. Then, in the area in which the high-quality areas of the input fingerprint data and the registered fingerprint data are present in common, the first calculating unit 33 compares the first input narrowing-down data and the first registered narrowing-down data, thereby calculating the first degree of narrowing-down similarity. The first calculating unit 33 calculates the first degree of narrowing-down similarity repeatedly by the classification of occurrence factor and performs the calculation repeatedly until the first degree of narrowing-down similarity is calculated with all pieces of first registered narrowing-down data.

$$S(I, T) = \sum_{\alpha \in U} S_\alpha(I, T) \quad (1)$$

As an example of an algorithm that thus calculates the first degree of narrowing-down similarity, the first calculating unit 33 can employ Formula (1) above. "I" in Formula (1) above indicates the input fingerprint data. "T" in Formula (1) above indicates the registered fingerprint data. "S(I,T)" in Formula (1) above indicates the first degree of narrowing-down similarity between the input fingerprint data I and the registered fingerprint data T by classification. "U" in Formula (1) above indicates a set of blocks corresponding to a high-quality area common in both the input fingerprint data I and the registered fingerprint data T. "$S_\alpha(I,T)$" in Formula (1) above indicates the degree of similarity between the first input narrowing-down data and the first input narrowing-down data of the registered fingerprint data T at a block $\alpha$.

The second calculating unit 34 is a processing unit that calculates the second degree of narrowing-down similarity from the second input narrowing-down data and the second registered narrowing-down data.

Described first is a case of calculating the second degree of narrowing-down similarity on the classification "scratch (crack)." Specifically, the second calculating unit 34 refers to the both reference information of the second input narrowing-down data and the second registered narrowing-down data, thereby performing alignment of the blocks of the two. The second calculating unit 34 then calculates the second degree of narrowing-down similarity using the following Formula (2).

$$C_1(I, T) = \frac{2 * N(I, T)}{N(I) + N(T)} \quad (2)$$

"I" in Formula (2) above indicates the input fingerprint data. "T" in Formula (2) above indicates the registered fingerprint data. "$C_1(I,T)$" in Formula (2) above indicates a correlation value of a low-quality area related to the classification "scratch (crack)" between the input fingerprint data I and the registered fingerprint data T. "N(I,T)" in Formula (2) above indicates the number of common blocks forming a low-quality area with a classification of "scratch (crack)" in the input fingerprint data I and the registered fingerprint data T. "N(I)" in Formula (2) above indicates the number of blocks forming the low-quality area with a classification of "scratch (crack)" of the input fingerprint data I. "N(T)" in Formula (2) above indicates the number of blocks forming the low-quality area with a classification of "scratch (crack)" of the registered fingerprint data T.

Thus, as more blocks form a low-quality area common in the second input narrowing-down data and the second registered narrowing-down data, a higher second degree of narrowing-down similarity is calculated by the second calculating unit 34. For this reason, the second calculating unit 34 calculates the second degree of narrowing-down similarity to be higher when scratches or cracks having the same shape are present at the same position in the second input narrowing-down data and the second registered narrowing-down data and calculates the second degree of narrowing-down similarity to be lower when cracks having different shapes are present at the same position. As a result, seemingly-low-value information of an unclear fingerprint-specific feature on a fingerprint image is effectively used for narrowing down.

Described next is a case of calculating the second degree of narrowing-down similarity on the classification "chapping." Because the chapping is likely to vary in a shorter period than a scratch or crack, the second registered narrowing-down data is preferably used in a limited period. In order to calculate the second degree of narrowing-down similarity on the classification "chapping," the second calculating unit 34 determines whether the registered fingerprint data is within a predetermined period after the previous successful authentication or the registration of fingerprint data. The period is preferably within two weeks to one month, which is an approximate period during which skin is replaced. The second calculating unit 34 then calculates the second degree of narrowing-down similarity if the registered fingerprint data is within the predetermined period after the previous successful authentication or the registration of fingerprint data.

Specifically, the second calculating unit 34 refers to the both reference information of the second input narrowing-down data and the second registered narrowing-down data, thereby performing alignment of the blocks of the two. The second calculating unit 34 then calculates the second degree of narrowing-down similarity using the following Formula (3).

$$C_2(I, T) = \frac{2 * N(I, T)}{N(I) + N(T)} \quad (3)$$

"I" in Formula (3) above indicates the input fingerprint data. "T" in Formula (3) above indicates the registered fingerprint data. "$C_2(I,T)$" in Formula (3) above indicates a correlation value of a low-quality area related to the classification "chapping" between the input fingerprint data I and the registered fingerprint data T. "$N(I,T)$" in Formula (3) above indicates the number of common blocks forming a low-quality area with a classification of "chapping" between the input fingerprint data I and the registered fingerprint data T. "$N(I)$" in Formula (3) above indicates the number of blocks forming the low-quality area with a classification of "chapping" of the input fingerprint data I. "$N(T)$" in Formula (3) above indicates the number of blocks forming the low-quality area with a classification of "chapping" of the registered fingerprint data T.

The narrowing-down unit 35 is a processing unit that narrows down the registered fingerprint data stored in the storage unit 32 to the registered fingerprint data to be compared with the input fingerprint data. As an example, the narrowing-down unit 35 adds the first degree of narrowing-down similarity calculated by the first calculating unit 33 and the second degree of narrowing-down similarity calculated by the second calculating unit 34, thereby calculating the integrated degree of similarity in which the both degrees of narrowing-down similarity of the high-quality area and the low-quality area are reflected. The narrowing-down unit 35 then performs narrowing down to registered fingerprint data corresponding to registered narrowing-down data whose integrated degree of similarity is within a predetermined ratio with respect to the total number N of the registered fingerprint data, for example, within the top one-tenth (=N/10). As another example, the narrowing-down unit 35 performs narrowing down to registered fingerprint data corresponding to registered narrowing-down data whose integrated degree of similarity is not less than a predetermined threshold. In calculating the integrated degree of similarity, the narrowing-down unit 35 may perform any statistical processing, not only addition.

The authenticating unit 36 is a processing unit that compares the registered fingerprint data obtained as a narrowing-down result by the narrowing-down unit 35 and the input fingerprint data to perform authentication. As an example, the authenticating unit 36 compares the registered fingerprint data narrowed down by the narrowing-down unit 35 and the input fingerprint data, thereby calculating a comparison score. The authenticating unit 36 determines whether the maximum comparison score out of comparison scores calculated earlier is not less than a predetermined threshold.

When the maximum comparison score is not less than the threshold, the authenticating unit 36 determines that fingerprint authentication is successful between the registered fingerprint data having the maximum comparison score and the input fingerprint data. When the maximum comparison score is less than the threshold, the authenticating unit 36 compares the registered fingerprint data other than the registered fingerprint data obtained as a narrowing-down result by the narrowing-down unit 35 and the input fingerprint data, thereby calculating a comparison score. When the maximum comparison score is less than the threshold then, the authenticating unit 36 then determines that the authentication of the input fingerprint data is unsuccessful. In contrast, when the maximum comparison score is not less than the threshold, the authenticating unit 36 determines that fingerprint authentication is successful between the registered fingerprint data having the maximum comparison score and the input fingerprint data. The authenticating unit 36 then transmits the authentication result to the terminal device 10. The authenticating unit 36 can employ any authentication method such as the minutiae method, the pattern matching method, or the frequency analysis method.

The registering unit 37 is a processing unit that registers, in the storage unit 32 in an associating manner, the second narrowing-down data input together with the input fingerprint data whose biometric authentication is successful at the authenticating unit 36 and the registered fingerprint data referred to in the successful biometric authentication.

As an example, when authentication is successful between the registered fingerprint data obtained as a narrowing-down result by the narrowing-down unit 35 and the input fingerprint data, or when authentication is successful between the registered fingerprint data other than the registered fingerprint data obtained as a narrowing-down result by the narrowing-down unit 35 and the input fingerprint data, the registering unit 37 starts up processing. When the second narrowing-down data has been already registered in association with the registered fingerprint data by the storage unit 32, the registering unit 37 registers in an overwriting manner the second narrowing-down data input together with the input fingerprint data whose authentication is successful this time. The registering unit 37 registers in an overwriting manner the second narrowing-down data for each of classifications "scratch (crack)," "chapping," and "water droplet."

As another example, the registering unit 37 registers or registers in an overwriting manner not only the second input narrowing-down data but also the first input narrowing-down data. If the first registered narrowing-down data is overwritten onto the new first input narrowing-down data, information including a low-quality area is also overwritten, which may degrade the quality of the first registered narrowing-down data. For this reason, the registering unit 37 registers or registers in an overwriting manner only a high-quality area by the classification of occurrence factor calculated together with the first degree of narrowing-down similarity by the first calculating unit 33.

For the first calculating unit 33, the second calculating unit 34, the narrowing-down unit 35, the authenticating unit 36, and the registering unit 37, various integrated circuits and electronic circuits may be employed. Examples of the integrated circuits include an ASIC. Examples of the electronic devices include a CPU and an MPU.

Flow of Processing

Described next is the flow of processing of the devices of the biometric authentication system according to the present embodiment. The following describes (1) log-in processing performed by the terminal device 10, and then (2) biometric authentication processing performed by the authentication server 30.

(1) Log-in Processing

Figure 15:
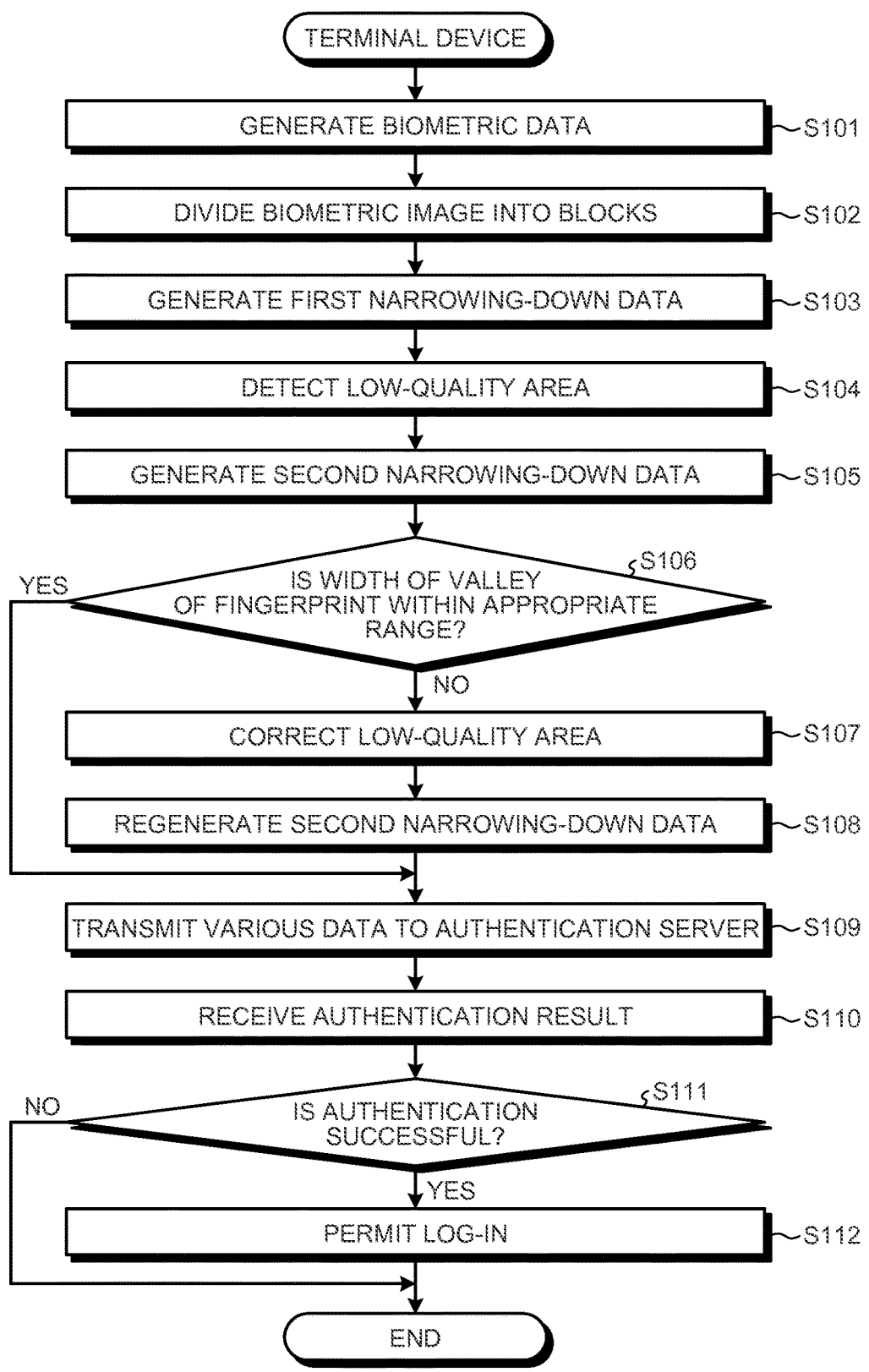
FIG. 15 is a flowchart illustrating a procedure of log-in processing according to the first embodiment.

FIG. 15 is a flowchart illustrating the procedure of log-in processing according to the first embodiment. This log-in processing starts up if a fingerprint image is read by the fingerprint sensor 12 of the terminal device 10 with the terminal device 10 started up.

As illustrated in FIG. 15, the fingerprint data generating unit 13 generates fingerprint data to be used for fingerprint authentication from a fingerprint image (Step S101). The dividing unit 14*a* then divides the fingerprint image into blocks with a certain size (Step S102).

Subsequently, using the fingerprint image divided into blocks by the dividing unit 14*a*, the first generating unit 14*b* generates first narrowing-down data related to a fingerprint-specific feature (Step S103). The detecting unit 14*c* then detects a low-quality area from the fingerprint image divided into blocks by the dividing unit 14*a* (Step S104). The second generating unit 14*d* then generates second narrowing-down data related to the low-quality area (Step S105).

The correcting unit 14*e* determines whether the width of a valley detected from the fingerprint image is within an appropriate range of the width of the valley suggesting an appropriate force applied in the use of the fingerprint sensor 12 (Step S106). If the width of the valley is within the appropriate range (Yes at Step S106), the flow skips the processing of Steps S107 and S108 and advances to Step S109.

If the width of the valley is not within the appropriate range (No at Step S106), the correcting unit 14*e* performs correction to enlarge or reduce the low-quality area detected by the detecting unit 14*c* (Step S107). Thereafter, the second generating unit 14*d* regenerates the second narrowing-down data including the identification numbers of the blocks forming the low-quality area corrected by the correcting unit 14*e* and the reference information used at the time of division into blocks (Step S108).

The communication I/F unit 11 transmits the input fingerprint data, the first input narrowing-down data, and the second input narrowing-down data to the authentication server 30 (Step S109). The communication I/F unit 11 then receives an authentication result from the authentication server 30 (Step S110).

If the authentication result is a success (Yes at Step S111), the OS executing unit 15 permits a log-in by the user to the terminal device 10 (Step S112) and ends the processing. If the authentication result is a failure (No at Step S111), the OS executing unit 15 does not permit a log-in and ends the processing.

The processing of Steps S103 and S104 illustrated in FIG. 15 and the processing Steps S105 and S108 illustrated in FIG. 15 are not always performed in the illustrated order and may be performed with the order reversed.

(2) Biometric Authentication Processing

Figure 16:
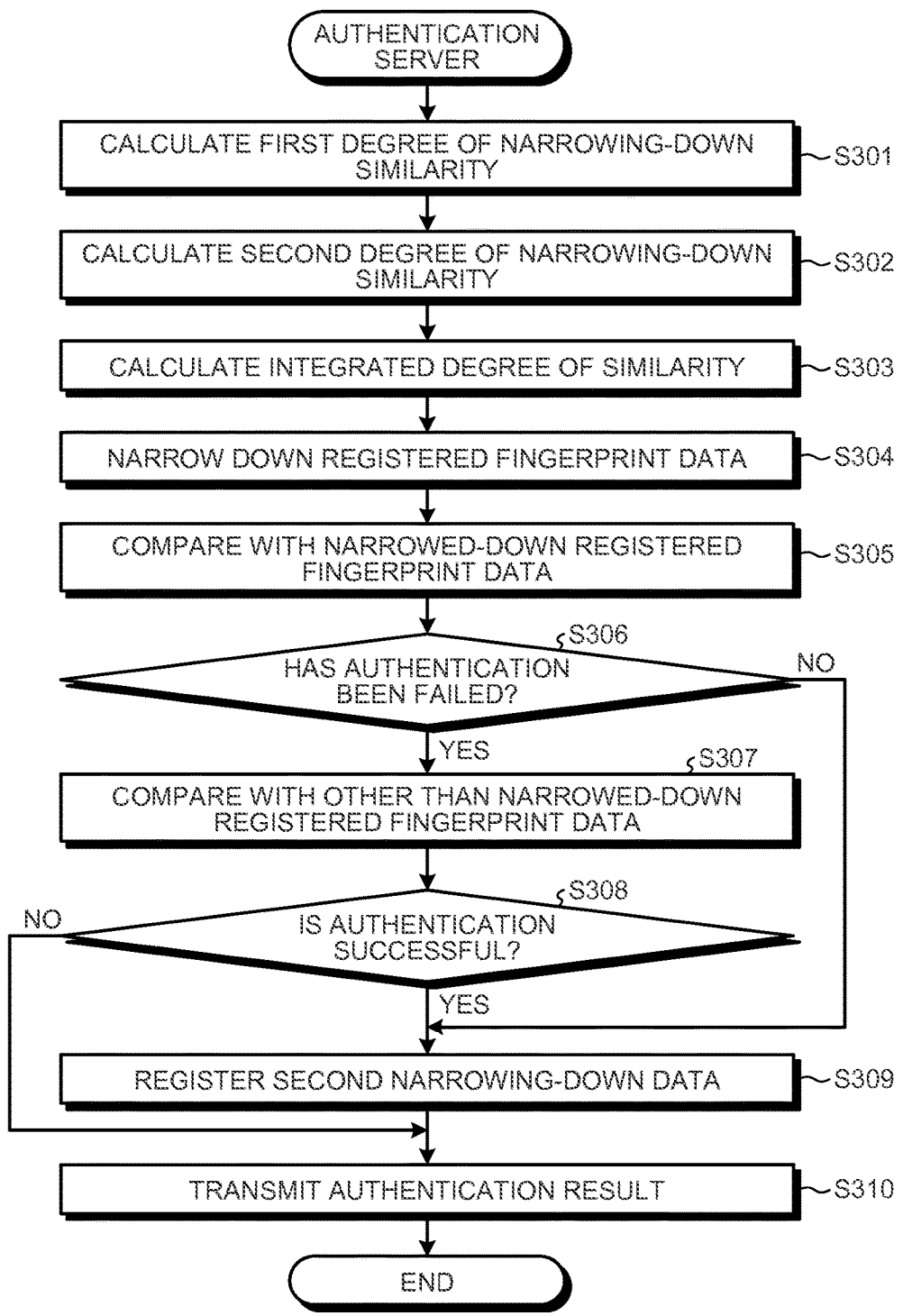
FIG. 16 is a flowchart illustrating a procedure of biometric authentication processing according to the first embodiment.

FIG. 16 is a flowchart illustrating the procedure of biometric authentication processing according to the first embodiment. This biometric authentication processing is processing that is repeatedly performed so long as the power of the authentication sever is on. The biometric authentication starts up upon receiving the input fingerprint data, the first input narrowing-down data, and the second input narrowing-down data from the terminal device 10.

As illustrated in FIG. 16, the first calculating unit 33 calculates the first degree of narrowing-down similarity from the first input narrowing-down data and the first registered narrowing-down data (Step S301). The second calculating unit 34 calculates the second degree of narrowing-down similarity from the second input narrowing-down data and the second registered narrowing-down data (Step S302).

Thereafter, using the first degree of narrowing-down similarity and the second degree of narrowing-down similarity, the narrowing-down unit 35 calculates the integrated degree of similarity in which both the degrees of narrowing-down similarity of the high-quality area and the low-quality area are reflected (Step S303). The narrowing-down unit 35 then performs narrowing down to registered fingerprint data corresponding to the registered narrowing-down data whose integrated degree of similarity is within a predetermined ratio with respect to the total number N of the registered fingerprint data, for example, within the top one-tenth (=N/10) (Step S304).

The authenticating unit 36 compares the registered fingerprint data obtained as a narrowing-down result by the narrowing-down unit 35 and the input fingerprint data (S305). If authentication is unsuccessful between the registered fingerprint data obtained as a narrowing-down result by the narrowing-down unit 35 and the input fingerprint data (No at Step S306), the authenticating unit 36 compares the registered fingerprint data other than registered fingerprint data obtained as a narrowing-down result by the narrowing-down unit 35 and the input fingerprint data (Step S307).

As a result, if authentication is successful between the registered fingerprint data other than registered fingerprint data obtained as a narrowing-down result by the narrowing-down unit 35 and the input fingerprint data (Yes at S308), the registering unit 37 performs the following processing. Specifically, the registering unit 37 registers, in the storage unit 32 in an associating manner, the second narrowing-down data, which is out of the data previously obtained as a narrowing-down result and input together with the input fingerprint data whose biometric authentication is successful next, and the registered fingerprint data referred to in the successful biometric authentication (Step S309). The authenticating unit 36 then transmits the authentication result to the terminal device 10 (Step S310) and ends the processing.

If authentication is unsuccessful even between the registered fingerprint data other than registered fingerprint data obtained as a narrowing-down result by the narrowing-down unit 35 and the input fingerprint data (No at Step S308), the authenticating unit 36 transmits the authentication result to the terminal device 10 (Step S310) and ends the processing.

If authentication is successful between the registered fingerprint data obtained as a narrowing-down result by the narrowing-down unit 35 and the input fingerprint data (Yes at Step S306), the registering unit 37 performs the following processing. Specifically, the registering unit 37 registers, in the storage unit 32 in an associating manner, the second narrowing-down data input together with the input fingerprint data whose biometric authentication by the authenticating unit 36 is successful and the registered fingerprint data referred to in the successful biometric authentication (Step S309). The authenticating unit 36 then transmits the authentication result to the terminal device 10 (Step S310) and ends the processing.

The processing of Steps S301 and S302 illustrated in FIG. 16 are not always performed in the illustrated order and may be performed with the order reversed.

Effect of First Embodiment

As described above, the biometric authentication system 1 according to the present embodiment, even when the fingerprint of the user changes due to a scratch or chapping, adds the position information of the area whose fingerprint-specific feature has become unclear on the fingerprint image because of the scratch or chapping to the registered fingerprint data as narrowing-down data once authentication is successful. As a result, the biometric authentication system 1 according to the present embodiment, when fingerprint data having a scratch or chapping is input in later authentication, performs narrowing down to registered fingerprint data having position information similar to the position information of that area. The biometric authentication system 1 according to the present embodiment therefore has an increased probability that the registered fingerprint data of the user who inputs the fingerprint is included in the narrowing-down result.

The biometric authentication system 1 according to the present embodiment can therefore stabilize the accuracy of narrowing down. Furthermore, because the biometric authentication system 1 according to the present embodiment has an increased probability that the registered fingerprint data of the user who inputs the fingerprint is included in the narrowing-down result, it can prevent a failure in authentication following a failure in narrowing down and reduce authentication time from the inputting of a fingerprint to the outputting of an authentication result.

The biometric authentication system 1 according to the present embodiment narrows down the registered fingerprint data to the registered fingerprint data having position information similar to the position information of the low-quality data detected from the input fingerprint image. As a result, the biometric authentication system 1 according to the present embodiment can effectively use low-value information of an unclear fingerprint-specific feature a fingerprint image for narrowing down.

The biometric authentication system 1 according to the present embodiment narrowing the registered fingerprint data down to the registered fingerprint data having position information similar to the position information of the low-quality area detected from the input fingerprint image and having a feature quantity similar to the first input narrowing-down data in an area other than the low-quality area. The biometric authentication system 1 according to the present embodiment can thereby effectively use information on the entire fingerprint image including low-value information of an unclear fingerprint-specific feature on a fingerprint image for narrowing down.

The biometric authentication system 1 according to the present embodiment corrects the position information of the low-quality area in accordance with the input state of the input fingerprint data. The biometric authentication system 1 according to the present embodiment performs narrowing down to the registered fingerprint data to be compared with the input fingerprint data based on the position information of the corrected low-quality area and the stored position information of the low-quality area. As a result, the biometric authentication system 1 according to the present embodiment can prevent variations in low-quality areas detected from the fingerprint of the same user. The biometric authentication system 1 according to the present embodiment can therefore stabilize the accuracy of narrowing down.

Second Embodiment

An embodiment of the disclosed system has been so far described. The present invention may be implemented in a variety of different embodiments. The following describes another embodiment included in the present invention.

Morphological Operations

Although a case was exemplified in which the correcting unit 14e enlarges or reduces the low-quality area in the short axis direction in the above first embodiment, the processing performed by the correcting unit 14e is not limited thereto. For example, in the disclosed system, when the average value of the width of valleys $W_{AV}$ is smaller than the lower limit value $L_1$ of the appropriate range of the width of the valley, the correcting unit 14e may enlarge the number of blocks of the low-quality area by expansion through the morphological operations. In the disclosed system, when the average value of the width of valleys $W_{AV}$ is larger than the upper limit value $L_2$ of the appropriate range of the width of the valley, the correcting unit 14e may reduce the number of blocks of the low-quality area by contraction through the morphological operations.

Standalone

Although a case is exemplified in which fingerprint authentication is performed by a client-server system in the above first embodiment, fingerprint authentication is not always performed by the system. For example, the functions of the fingerprint data generating unit 13, narrowing-down data generating unit 14, the first calculating unit 33, the second calculating unit 34, the narrowing-down unit 35, the authenticating unit 36, and the registering unit 37 may be installed in a notebook personal computer or a cellular phone to be implemented stand-alone.

Authentication Environment

Although a case of being applied to log-in authentication for a PC is exemplified in the above first embodiment, the disclosed system is not limited thereto and can be widely applied to environments in which biometric authentication is used, including a case of performing biometric authentication on a log-in to an application and a case of performing biometric authentication on entering and leaving a room.

Other than Fingerprint

Although a case of performing fingerprint authentication is exemplified in the above first embodiment, the disclosed system is not limited thereto and can be similarly applied to other biometric authentication using a palm print or a vein. For example, vein authentication has a similar problem that there is a temporary change in biometric information due to a thrombus in a vein, and thus the disclosed system can be similarly applied there.

Distribution and Integration

The components of the illustrated device are not always requested to be physically configured as illustrated. In other words, a specific form of the distribution and integration of the device is not limited to the illustrated one, and part of or the entire the device may be configured through functional or physical distribution and integration in an arbitrary unit depending on various loads and use conditions. For example, the first calculating unit 33, the second calculating unit 34, the narrowing-down unit 35, the authenticating unit 36, or the registering unit 37 may be connected as an external device of the authentication server 30 through a network. The first calculating unit 33, the second calculating unit 34, the narrowing-down unit 35, the authenticating unit 36, or the registering unit 37 each may be included in another device and are connected through a network to cooperate, thereby achieving the above functions of the biometric authentication system. The fingerprint data generating unit 13, the narrowing-down data generating unit 14, and part of or the entire functions included in the narrowing-down data generating unit 14 may be connected as an external device through a network. The fingerprint data generating unit 13, the narrowing-down data generating unit 14, and part of or the entire functions included in the narrowing-down data generating unit 14 each may be included in another device and are connected through a network to cooperate, thereby achieving the above functions of the biometric authentication system.

Biometric Authentication Program

Various pieces of processing described in the above embodiment may be achieved by executing a program prepared in advance with a computer such as a personal computer or a workstation. The following describes an example of a computer that executes a biometric authentication program having the same functions as the above embodiments using FIG. 17.

Figure 17:
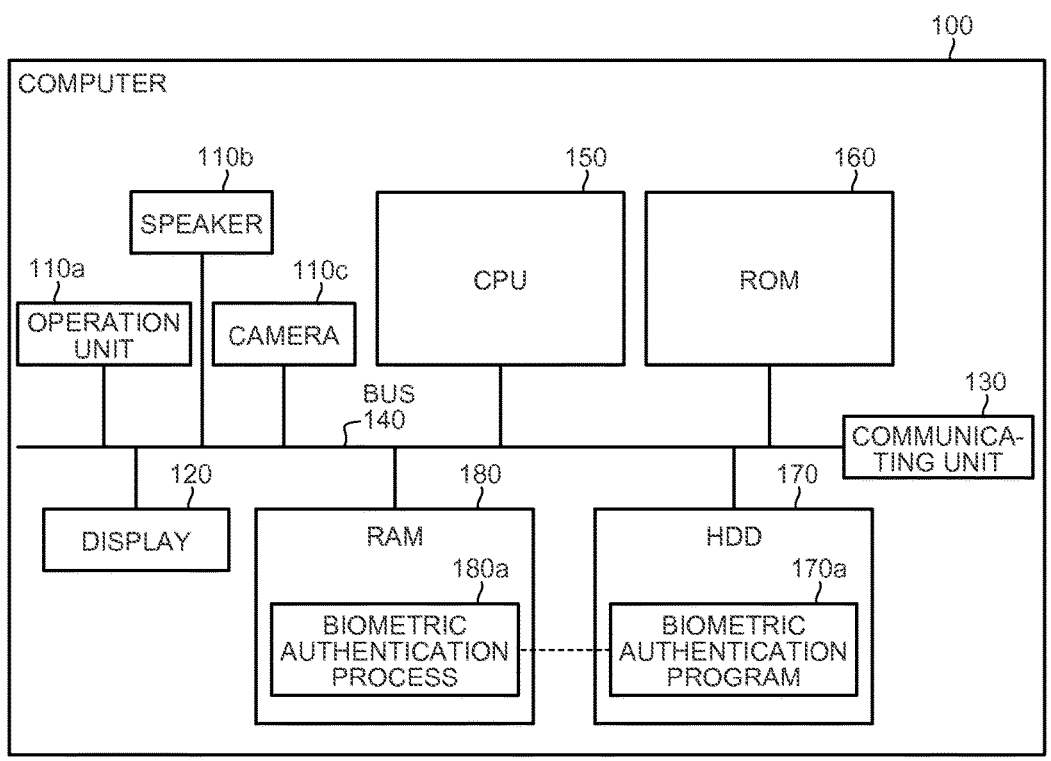
FIG. 17 is a diagram for describing an example of a computer that executes a biometric authentication program according to the first embodiment and a second embodiment.

FIG. 17 is a diagram for describing an example of a computer that executes the biometric authentication program according to the first embodiment and the second embodiment. As illustrated in FIG. 17, this computer 100 includes an operation unit 110a, a speaker 110b, a camera 110c, a display 120, and a communicating unit 130. The computer 100 also includes a CPU 150, a ROM 160, an HDD 170, and a RAM 180. These units with the reference numerals 110 to 180 are connected through a bus 140.

The HDD 170 stores therein in advance a biometric authentication program 170a that exhibits the same functions as the first calculating unit 33, the second calculating unit 34, the narrowing-down unit 35, the authenticating unit 36, and the registering unit 37 described in the above first embodiment. The biometric authentication program 170a may be appropriately integrated or separated in the same manner as the components illustrated in FIG. 2, such as the first calculating unit 33, the second calculating unit 34, the narrowing-down unit 35, the authenticating unit 36, and the registering unit 37. Namely, all data illustrated as stored in the HDD 170 does not always have to be stored in the HDD 170, and it is sufficient if data for each process is stored in the HDD 170.

The CPU 150 reads the biometric authentication program 170a out of the HDD 170 and loads it into the RAM 180. As illustrated in FIG. 17, thereby, the biometric authentication program 170a functions as a biometric authentication process 180a. This biometric authentication process 180a loads various types of data read out of the HDD 170 into their own areas appropriately assigned on the RAM 180, and based on the loaded various types of data, various types of processing are executed. The biometric authentication process 180a includes the processing executed by the first calculating unit 33, the second calculating unit 34, the narrowing-down unit 35, the authenticating unit 36, and the registering unit 37 illustrated in FIG. 2, for example, the processing illustrated in FIG. 15 and FIG. 16. Furthermore, all the processing units illustrated as virtually realized on the CPU 150 do not always have to operate on the CPU 150, and it is sufficient if a processing unit for each process is virtually realized.

The biometric authentication program 170a does not always have to be stored in the HDD 170 or the ROM 160 in advance. For example, the program is stored in portable physical media such as a flexible disk, that is, an FD, a CD-ROM, a DVD disk, an optical disk, and an IC card, which are inserted into the computer 100. The computer 100 may acquire the program from the portable physical media to execute it. The program may be stored in another computer or a server device connected to the computer 100 through a public network, the Internet, a LAN, a WAN, or the like, and the computer 100 may acquire the program therefrom and execute it.

An embodiment of a biometric authentication system disclosed by the present application provides the effect of stabilizing the accuracy of narrowing down.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication system comprising:
a memory; and
a processor coupled to the memory, wherein the processor executes a process including:
storing, in the memory in an associating manner, a form of distribution formed by collection of position information of a feature area on an image of biometric information whose biometric authentication is successful and reference biometric information referred to in the successful biometric authentication, the feature area being specific to a living-body;
detecting a feature area that is specific to a living-body from an image of biometric information of an input object to be authenticated;
first calculating a first degree of similarity between a form of distribution formed by collection of the position information of the feature area detected at the detecting and the form of the distribution formed by the collection of the position information of the reference biometric information stored in the memory;
second calculating, in an area other than the feature area detected at the detecting, a second degree of similarity between a feature quantity of the biometric information of the object to be authenticated and a feature quantity of the reference biometric information stored in the memory;
third calculating a third degree of similarity based on the first degree of similarity and the second degree of similarity;

narrowing down the reference biometric information stored in the memory to reference biometric information having the third degree of similarity that is not less than a predetermined threshold as reference biometric information to be compared with the biometric information of the object to be authenticated; and authenticating the biometric information of the object to be authenticated by comparing the reference biometric information obtained as a narrowing-down result at the narrowing down and the biometric information of the object to be authenticated.

2. The biometric authentication system according to claim 1, wherein the feature area is an area in which a biometric feature is unclear.

3. The biometric authentication system according to claim 1, wherein the process further includes correcting the feature area detected at the detecting in accordance with an input state in which the biometric information of the object to be authenticated is input, wherein the first calculating includes calculating the first degree of similarity between a form of distribution formed by collection of the position information of the feature area corrected at the correcting and the form of the distribution formed by the collection of the position information of the reference biometric information stored in the memory; and the second calculating includes calculating, in an area other than the feature area corrected at the correcting, the second degree of similarity between the feature quantity of the biometric information of the object to be authenticated and the feature quantity of the reference biometric information stored in the memory.

4. A biometric authentication method comprising:

storing, using a processor, a form of distribution formed by collection of position information of a feature area on an image of biometric information whose biometric authentication is successful and reference biometric information referred to in the successful biometric authentication in a storage in an associating manner, the feature area being specific to a living-body;

detecting, using the processor, a feature area that is specific to a living-body from an image of biometric information of an input object to be authenticated;

first calculating a first degree of similarity between a form of distribution formed by collection of the position information of the feature area detected at the detecting and the form of the distribution formed by the collection of the position information of the reference biometric information stored in the memory;

second calculating, in an area other than the feature area detected at the detecting, a second degree of similarity between a feature quantity of the biometric information of the object to be authenticated and a feature quantity of the reference biometric information stored in the memory;

third calculating a third degree of similarity based on the first degree of similarity and the second degree of similarity;

narrowing down, using the processor, the reference biometric information stored in the storage to reference biometric information having the third degree of similarity that is not less than a predetermined threshold as reference biometric information to be compared with the biometric information of the object to be authenticated; and authenticating, using the processor, the biometric information of the object to be authenticated by comparing the reference biometric information obtained as a narrowing-down result and the biometric information of the object to be authenticated.

5. A non-transitory computer readable recording medium having stored therein a biometric authentication program that causes a computer to execute a process comprising:

storing, in a storage in an associating manner, a form of distribution formed by collection of position information of a feature area on an image of biometric information whose biometric authentication is successful and reference biometric information referred to in the successful biometric authentication, the feature being specific to a living-body;

receiving position information of a feature area that is specific to a living-body detected from an image of biometric information of an object to be authenticated;

first calculating a first degree of similarity between a form of distribution formed by collection of the position information of the feature area received at the received and the form of the distribution formed by the collection of the position information of the reference biometric information stored in the memory;

second calculating, in an area other than the feature area received at the receiving, a second degree of similarity between a feature quantity of the biometric information of the object to be authenticated and a feature quantity of the reference biometric information stored in the memory;

third calculating a third degree of similarity based on the first degree of similarity and the second degree of similarity;

narrowing down the reference biometric information stored in the storage to reference biometric information having the third degree of similarity that is not less than a predetermined threshold as reference biometric information to be compared with the biometric information of the object to be authenticated; and authenticating the biometric information of the object to be authenticated by comparing the reference biometric information obtained as a narrowing-down result and the biometric information of the object to be authenticated.

* * * * *